(12) United States Patent
Wu et al.

(10) Patent No.: US 9,725,607 B2
(45) Date of Patent: Aug. 8, 2017

(54) WATERPROOF PAINT FORMULA AND A PEN DEVICE FOR USING THE SAME

(71) Applicant: Wen-Chou Wu, New Taipei (TW)

(72) Inventors: Wen-Chou Wu, New Taipei (TW); Eileen Strevell Boehne, Naperville, IL (US)

(73) Assignee: Wen-Chou Wu, Changhua (TW)

( * ) Notice: Subject to any disclaimer, the term of this patent is extended or adjusted under 35 U.S.C. 154(b) by 201 days.

(21) Appl. No.: 14/857,826

(22) Filed: Sep. 18, 2015

(65) Prior Publication Data

US 2017/0066938 A1    Mar. 9, 2017

(30) Foreign Application Priority Data

Sep. 7, 2015    (TW) .............................. 104129565 A

(51) Int. Cl.
*C09D 11/16*    (2014.01)
*B43K 8/04*    (2006.01)
*C09D 5/00*    (2006.01)

(52) U.S. Cl.
CPC ................ *C09D 11/16* (2013.01); *B43K 8/04* (2013.01); *C09D 5/00* (2013.01)

(58) Field of Classification Search
CPC combination set(s) only.
See application file for complete search history.

(56) References Cited

U.S. PATENT DOCUMENTS

| | | | |
|---|---|---|---|
| 9,068,095 B2* | 6/2015 | Shimohara | ........... C09D 11/101 |
| 2013/0078460 A1* | 3/2013 | Tasaka | ................ C09D 5/1637 |
| | | | 428/339 |
| 2014/0243463 A1* | 8/2014 | Choi | .................... C09D 169/00 |
| | | | 524/361 |

* cited by examiner

*Primary Examiner* — David Walczak
(74) *Attorney, Agent, or Firm* — Yuwen Guo

(57) ABSTRACT

A waterproof paint formula and a pen device for using the same. The concentration of the formula may be adjusted by changing the weight percentage of the aqueous solution and cooperate with different outlet diameter of the nibs to make the waterproof paint smoothly flow out for painting on the writings. Simultaneously, the weight percentage of Ethyl Alcohol may be adjusted to control the air-dried speed of the waterproof paint to achieve the effects of waterproof and preventing the inks or colors from diffusion.

9 Claims, 8 Drawing Sheets

WATERPROOF PAINT FORMULA AND A PEN DEVICE FOR USING THE SAME

FIELD OF THE INVENTION

The present invention relates to a waterproof pen device, and more particularly to a waterproof paint formula and a pen device for using the same.

BACKGROUND OF THE INVENTION

When writing or painting, the inks or colors of the pen device are staying on the paper. If the inks or colors want to be kept, they should be oily. Although the oily inks or colors may not be diffused while contacting with water or aqueous solutions, it will be blurred due to the moisture in the air after a long time. Besides, the colors which are painting on the drawings after solidifying, they are also easy to be solved due to the moisture in the air to result in damaging the drawing.

Please reference to a Chinese patent. CN1865364, which is disclosed a pigment carbon black neutral pen ink and its preparation method. The constituents include (by weight portion) carbon black color paste 30-40%, solvent 10-30%, thickening agent 1-5%, volatilization suppressing agent 0.5-5%, pH conditioning agent 1-3%, lubricating agent 1-2%, antirust agent 0.5-2%, preservative agent 0.5-2%, and deionized water 30-50%.

The above mentioned ink has the neutral characteristics in the ink itself. It is only used while writing and not used for painting. If the writings or drawings have been written with inks or painted with colors, the above mentioned pen is not capable for be used for waterproof.

In view of the foregoing circumstances, the inventor has invested a lot of time to study the relevant knowledge, compare the pros and cons, research and develop related products. After quite many experiments and tests, the "waterproof paint formula and the pen device for using the same" of this invention is eventually launched to improve the foregoing shortcomings, to meet the public use.

SUMMARY OF THE INVENTION

An objective of this invention is providing a waterproof paint formula and a pen device for using the same. The concentration of the waterproof paint may be adjusted by adjusting the weight percentage of the aqueous solution. Cooperating with the nibs with different outlet diameters, the waterproof paint may be smoothly flowed out from the nibs for painting the writings. The air-dried speed of the waterproof paint may be controlled by adjusting the weight percentage of the Ethyl Alcohol. The waterproof paint may be painted on the writings to achieve the effects of waterproof and preventing from diffusion. And the writings may be kept original and not possible for marking or writing again.

To achieve above objectives, a waterproof paint formula is disclosed. The waterproof paint comprises an adhesive, an aqueous solution, and a desiccant, wherein the weight percentage of the adhesive is ranged from 80% to 90%, the weight percentage of the aqueous solution is ranged from 5% to 15%, the weight percentage of the desiccant is 5%, and the total weight percentage of the waterproof paint is 100% by adjusting the weight percentage of the adhesive and the aqueous solution.

In some embodiments, the adhesive includes a main ingredient and a minor ingredient, the main ingredient is composed of VINYL ACETATE ACRYLATE COPOLYMER and ACRYLIC COPOLYMER, and the minor ingredient is composed of AQUEOUS POLYVINYL ACETATE.

In some embodiments, the main ingredient is Latex, and the minor ingredient is white glues.

In some embodiments, the weight percentage of the adhesive is 85%, the weight percentage of the main ingredient is 70%, the weight percentage of the minor ingredient is 15%, the weight percentage of the aqueous solution is 10%, and the viscosity number of the waterproof paint is 21 cps.

In some embodiments, the desiccant is Ethyl Alcohol.

The present invention further disclosed a pen device, at least comprising: a barrel; a first end cap member, integrated with one end of the barrel; a reservoir, inserted into the barrel, one end of the reservoir is fluidly communicated with the first end cap member, and the waterproof paint is received in the reservoir; a first nib, fluidly communicated with one end of the first end cap member distant from the reservoir; and a first cover, removably covered one end of the barrel adjacent to the first end cap member, and the first end cap member and the first nib are covered by the first cover; wherein the waterproof paint is adaptably flowed out from the first nib.

The pen device may further comprise a second end cap member, a second nib, and a second cover, the second end cover member is fluidly communicated with one end of the reservoir distant from the first end cap member, the second nib is fluidly communicated with one end of the second end cap member distant from the reservoir, the second cover is removably covered one end of the barrel adjacent to the second end cap member and covers the second end cap member and the second nib, and the waterproof paint is adaptably flowed out from the second nib.

In some embodiments, an outlet diameter of the first nib is larger than an outlet diameter of the second nib.

In some embodiments, the porosities of the first nib and the second nib are 50%~80%.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
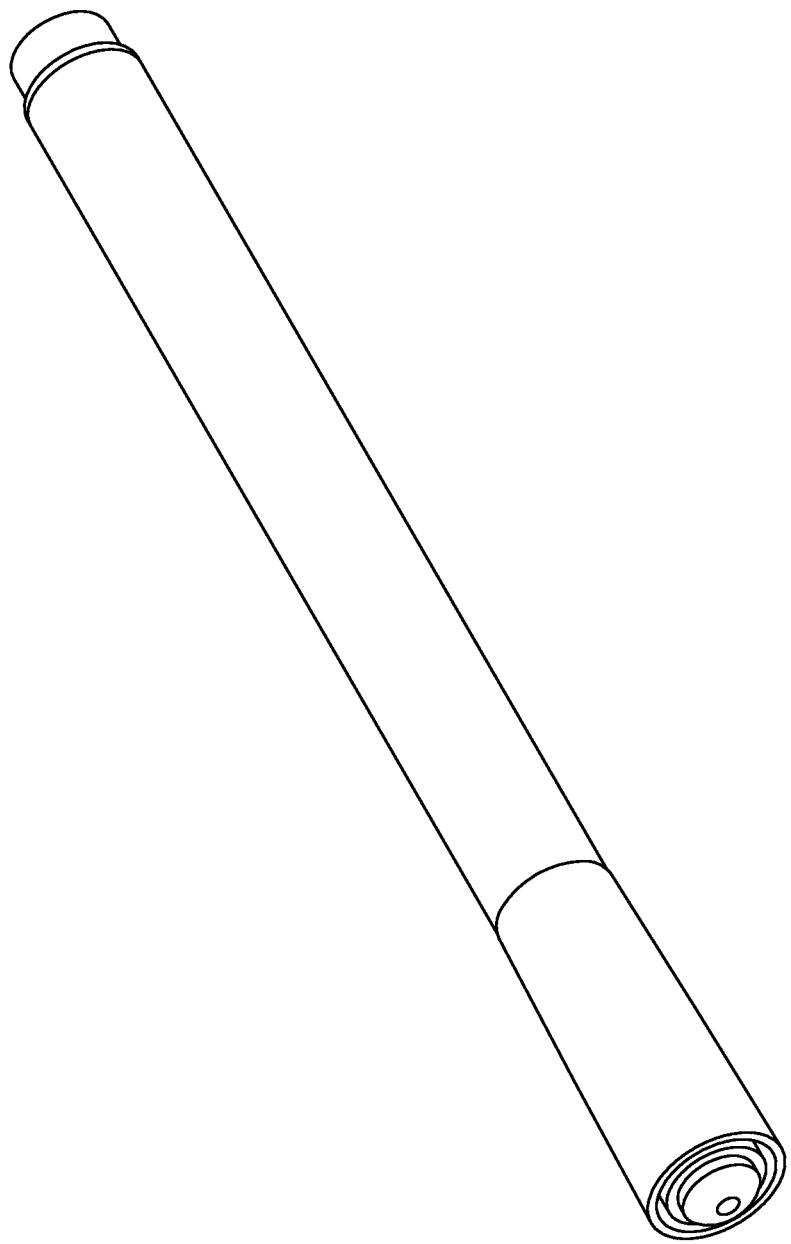
FIG. 1 is a perspective view of a first embodiment of a pen device of the present invention.

Referring now to the drawings where like characteristics and features among the various figures are denoted by like reference characters.

A waterproof paint formula of the present invention is disclosed. The waterproof paint comprises an adhesive, an aqueous solution, and a desiccant (such as Ethyl Alcohol). The weight percentage of the adhesive is ranged from 80% to 90%. The weight percentage of the aqueous solution is ranged from 5% to 15%. The weight percentage of the desiccant is 5%. And the total weight percentage of the waterproof paint is 100% by adjusting the weight percentage of the adhesive and the aqueous solution.

In addition, the adhesive includes a main ingredient and a minor ingredient. The main ingredient is composed of VINYL ACETATE ACRYLATE COPOLYMER and ACRYLIC COPOLYMER. The main ingredient may be called "Latex". The weight percentage of the main gradient is higher, and the waterproof property is better. And the minor ingredient is composed of AQUEOUS POLYVINYL ACETATE. The minor gradient may be called "white glues". The weight percentage of the minor ingredient is higher, and the viscosity is better.

Preferably, the weight percentage of the adhesive is 85%. The weight percentage of the main ingredient is 70% and the weight percentage of the minor ingredient is 15%. The weight percentage of the aqueous solution is 10%. So, the viscosity number of the waterproof paint is controlled at 21 cps.

The concentration of the waterproof paint may be controlled by adjusting the weight percentage of the aqueous solution. The desiccant may be Ethyl Alcohol and is provided for being quickly air-dried. And then the air-dried speed may be controlled.

Figure 2:
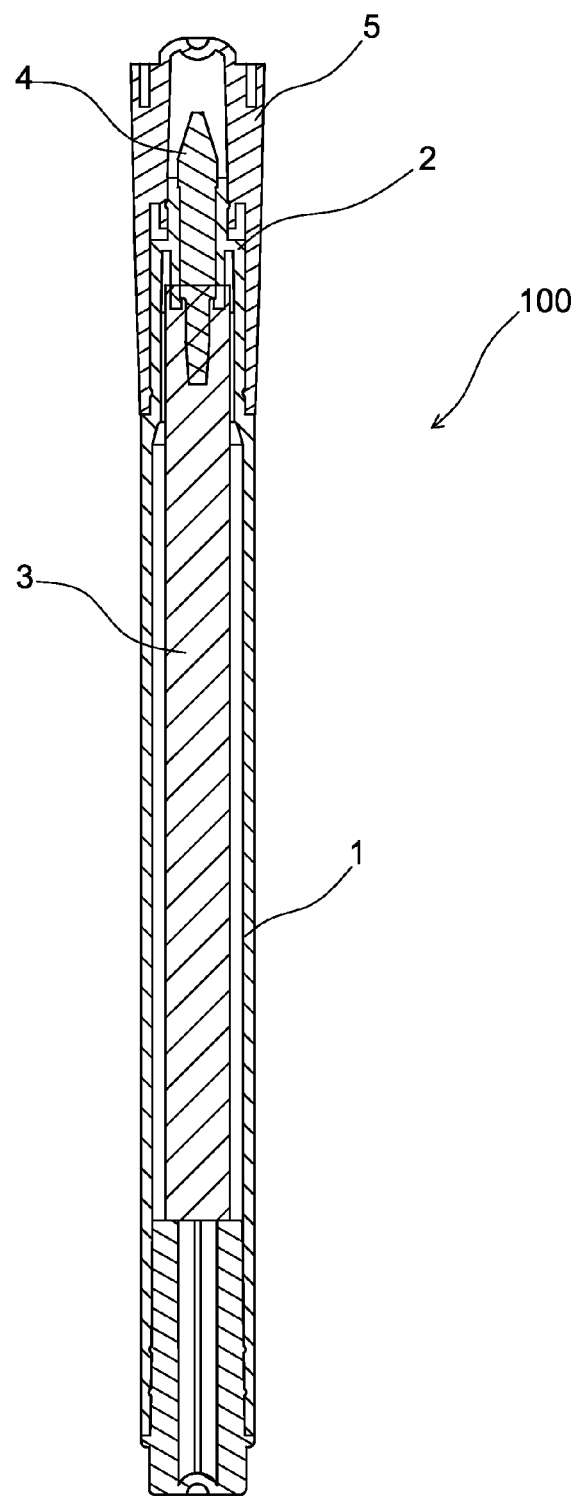
FIG. 2 is a cross-sectional view of the first embodiment of the present invention.

Please refer to FIGS. 1 and 2, the first embodiment of the pen device 100 for using the above mentioned waterproof paint of the present invention may comprise a barrel 1, a first end cap member 2, a reservoir 3, a first nib 4, and a first cover 5.

The first end cap member 2 may be integrated with one end of the barrel. The barrel 1 of the first embodiment has an opened end which is connected with the first end cap member 2 and a closed end.

The reservoir 3 may be inserted into the barrel 1. One end of the reservoir 3 is fluidly communicated with the first end cap member 2 and the above mentioned waterproof paint is received in the reservoir 3.

The first nib 4 may be fluidly communicated with one end of the first end cap member 2 which is distant from the reservoir 3.

The first cover 5 may removably covere one end of the barrel 1 which is adjacent to the first end cap member 2. The first end cap member 2 and the first nib 4 may be covered by the first cover 5.

Therefore, the waterproof paint may be adaptably flowed out from the first nib. 4 for painting on the writings.

Figure 3:
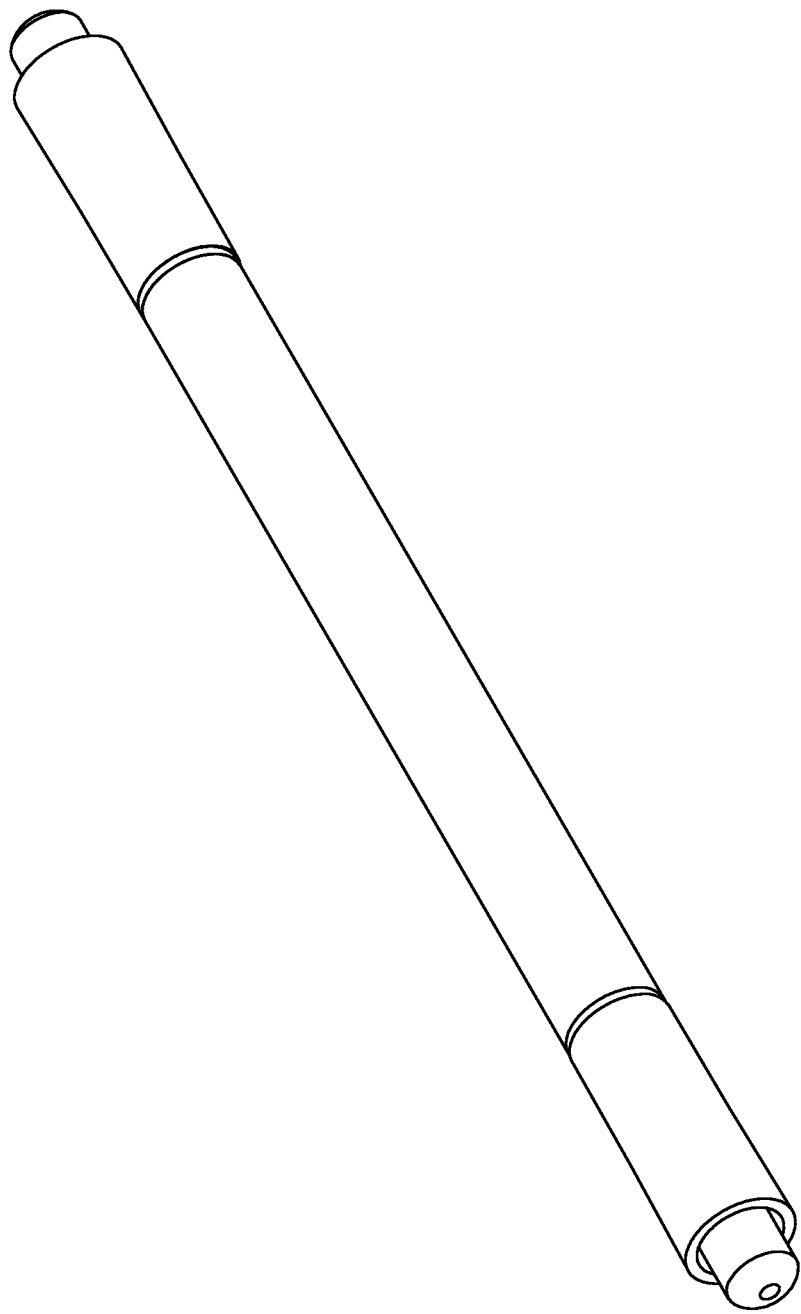
FIG. 3 is a perspective view of a second embodiment of the pen device of the present invention.
Figure 4:
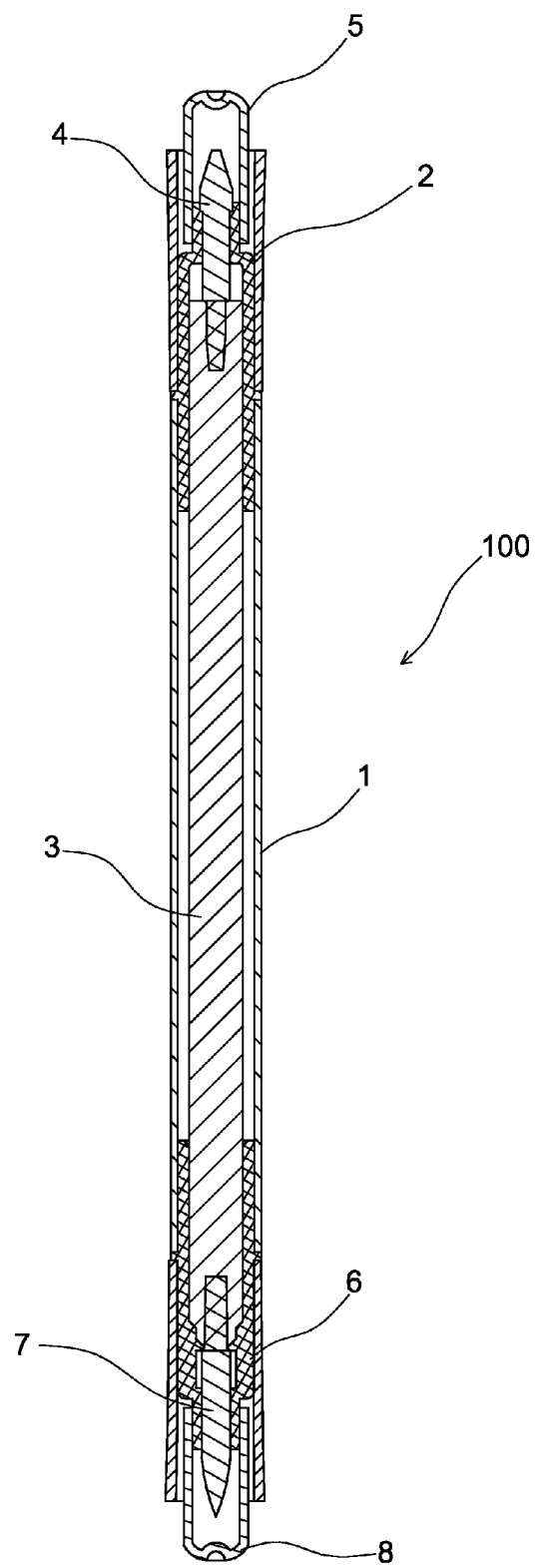
FIG. 4 is a cross-sectional view of the second embodiment of the present invention.
Figure 5:
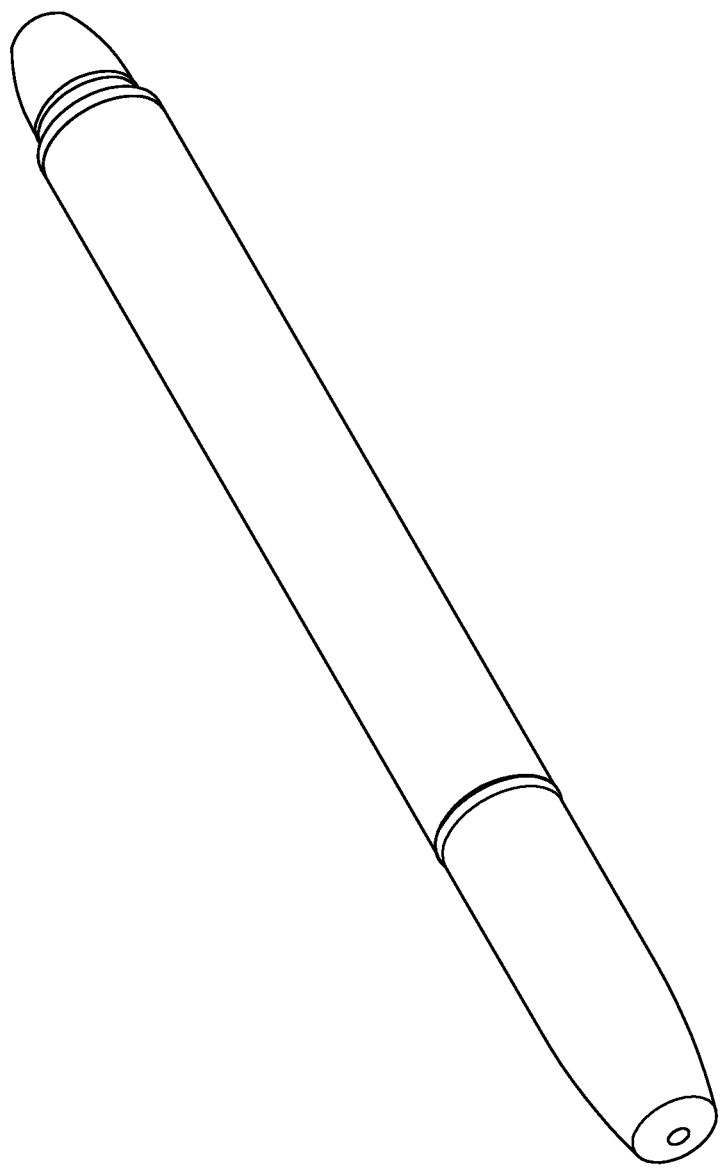
FIG. 5 is a perspective view of a third embodiment of the pen device of the present invention.
Figure 6:
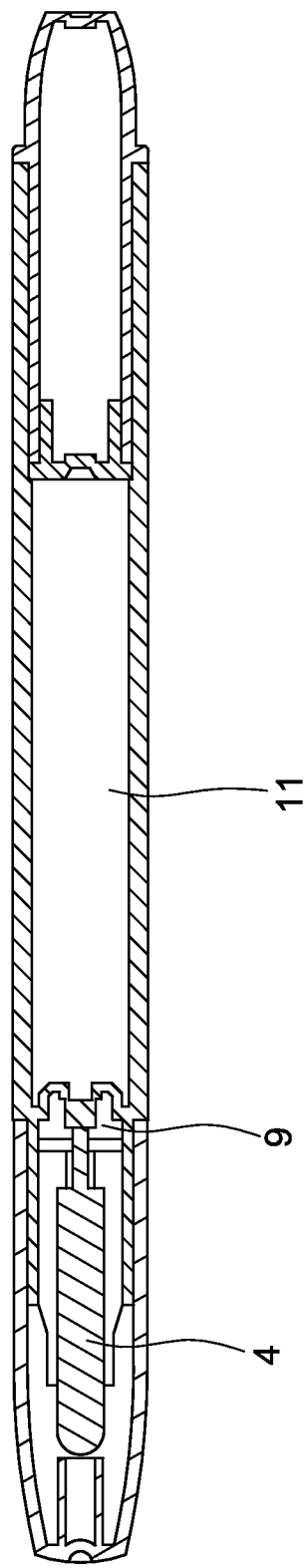
FIG. 6 is a cross-sectional view of the third embodiment of the present invention.
Figure 7:
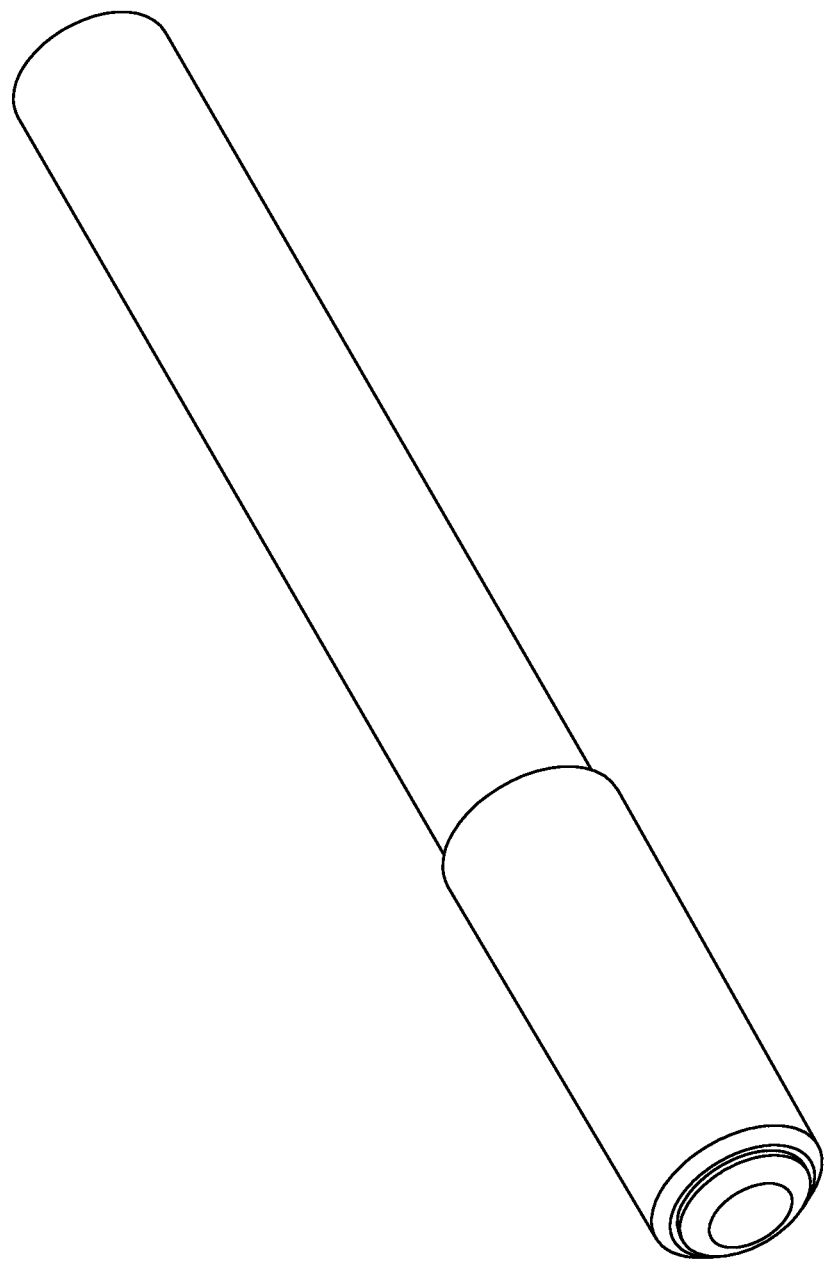
FIG. 7 is a perspective view of a fourth embodiment of the pen device of the present invention.
Figure 8:
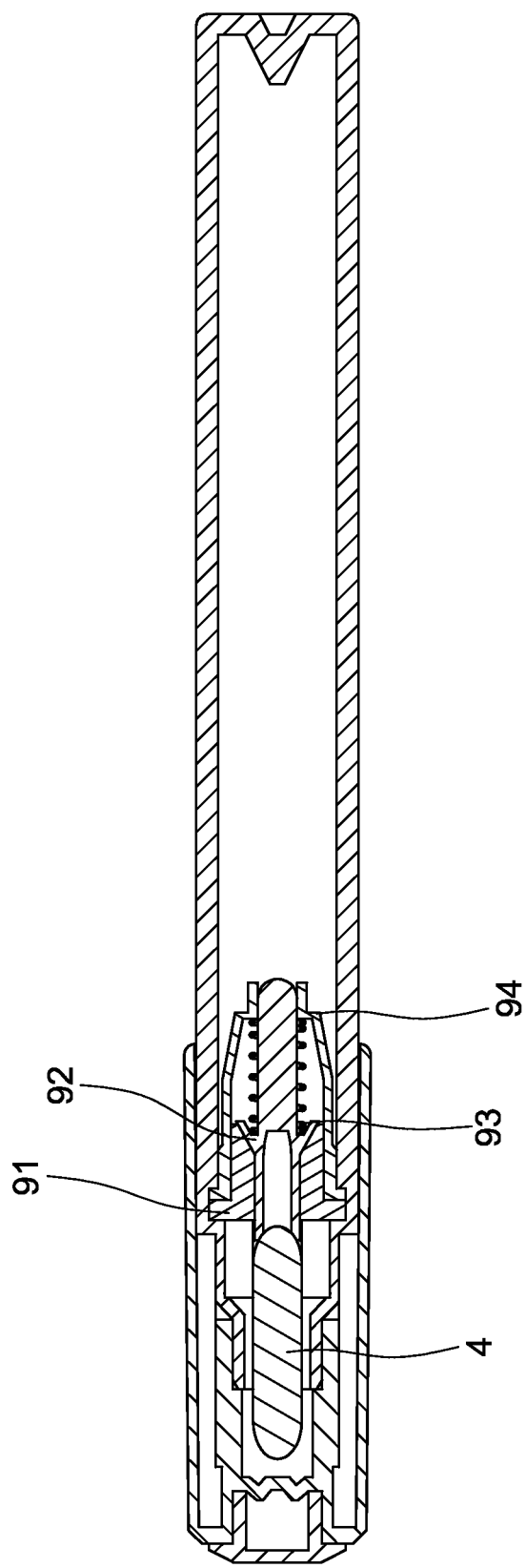
FIG. 8 is a cross-sectional view of the fourth embodiment of the present invention.

Please refer to FIGS. 3 and 4. Compared to the first embodiment, the second embodiment of the pen device 100 further comprises a second end cap member 6, a second nib 7, and a second cover 8. The barrel 1 of the second embodiment has the opened end which is connected with the first end cap member 2 and the closed end.

The second end cover member 6 is fluidly communicated with one end of the reservoir 3 which is distant from the first end cap member 2. The second nib 7 is fluidly communicated with one end of the second end cap member 6 which is distant from the reservoir 3. The second cover 8 removably covere one end of the barrel 1 which is adjacent to the second end cap member 6 and covers the second end cap member 6 and the second nib 7. Therefore, the above mentioned waterproof paint may be adaptably flowed out from the second nib 7 for painting on the writings.

In addition, an outlet diameter of the first nib 4 is larger than an outlet diameter of the second nib 7, and the waterproof paint may be smoothly flowed out from the first nib 4 and the second nib 7 for painting on the writings. The porosities of the first nib 4 and the second nib 7 may be 50%~80%.

In conclusion, according to above mentioned formula and structure, the concentration of the waterproof paint may be adjusted by adjusting the weight percentage of the aqueous solution. Cooperating with the nibs with different outlet diameters, the waterproof paint may be smoothly flowed out from the nibs for painting the writings. The air-dried speed of the waterproof paint may be controlled by adjusting the weight percentage of the Ethyl Alcohol. The waterproof paint may be painted on the writings to achieve the effects of waterproof and preventing from diffusion. And the writings may be kept original and not possible for marking or writing again.

Please refer to FIGS. 5 to 8, the first nib 4 and the reservoir 3 are fluidly communicated with each other so as to make the waterproof paint be capable for painting on the writings. The third and the fourth embodiments have a valve member 9. The first nib 4 is arranged at one end of the valve member 9 for cooperating with the cavity 11. The waterproof paint which is received in the cavity 11 may be smoothly flowed out from the nib 4 by controlling the open and close of the valve member 9.

The pen device 100 of the embodiments comprises the barrel 1 which has the cavity 11, the first end cap member 2, the valve member 9, the first nib 4, and the first cover 5. The valve member 9 includes a front cap 91, a piston rod 92, a spring member 93, and a rear cap 94. The front cap 91 is fixed at the first end cap member 2 for fixing the pen device 100. One end of piston rod 92 is providing for receiving the first nib 4 and the other end thereof is providing for arranging the spring member 93 and then engaged with the rear cap 94.

When the first nib 4 is forced, the first nib 4, the piston rod 92 and the spring member 93 are moved toward the cavity 11 and the waterproof paint may be guided and sucked into the first nib 4 while the end of the piston rod 92 is protruding into the cavity 11. The spring member 93 may provide a force in an opposite direction to push the valve member 9 so that the first nib 4 and the valve 9 may be reset.

The first cover 5 may removably cover the end of the barrel 1 which is adjacent to the first end cap member 2 and cover the first end cap member 2 and the first nib 4.

Therefore, the concentration of the waterproof paint may be adjusted and the waterproof paint may be flowed out from the first nib 4 for painting on the writings.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A waterproof paint formula, the waterproof paint comprising an adhesive, an aqueous solution, and a desiccant, wherein the weight percentage of the adhesive is ranged from 80% to 90%, the weight percentage of the aqueous solution is ranged from 5% to 15%, the weight percentage of the desiccant is 5%, and the total weight percentage of the waterproof paint is 100% by adjusting the weight percentage of the adhesive and the aqueous solution.

2. The formula as claimed in claim 1, wherein the adhesive includes a main ingredient and a minor ingredient, the main ingredient is composed of VINYL ACETATE ACRYLATE COPOLYMER and ACRYLIC COPOLYMER, and the minor ingredient is composed of AQUEOUS POLYVINYL ACETATE.

3. The formula as claimed in claim 2, wherein the main ingredient is Latex, and the minor ingredient is white glue.

4. The formula as claimed in claim 2, wherein the weight percentage of the adhesive is 85%, the weight percentage of the main ingredient is 70%, the weight percentage of the minor ingredient is 15%, the weight percentage of the aqueous solution is 10%, and the viscosity number of the waterproof paint is 21 cps.

5. The formula as claimed in claim 1, wherein the desiccant is Ethyl Alcohol.

6. A pen device using the waterproof paint as claimed in any one of claims 1 to 5, at least comprising:
a barrel;
a first end cap member, integrated with one end of the barrel;
a reservoir, inserted into the barrel, one end of the reservoir is fluidly communicated with the first end cap member, and the waterproof paint is received in the reservoir;
a first nib, fluidly communicated with one end of the first end cap member distant from the reservoir; and
a first cover, removably covering one end of the barrel adjacent to the first end cap member, and the first end cap member and the first nib are covered by the first cover;
wherein the waterproof paint is adaptably flowed out from the first nib.

7. The pen device as claimed in claim 6, further comprising a second end cap member, a second nib, and a second cover, the second end cover member is fluidly communicated with one end of the reservoir distant from the first end cap member, the second nib is fluidly communicated with one end of the second end cap member distant from the reservoir, the second cover is removably covered one end of the barrel adjacent to the second end cap member and covers the second end cap member and the second nib, and the waterproof paint is adaptably flowed out from the second nib.

8. The pen device as claimed in claim 7, wherein an outlet diameter of the first nib is larger than an outlet diameter of the second nib.

9. The pen device as claimed in claim 7, wherein the porosities of the first nib and the second nib are 50%~80%.

* * * * *